United States Patent [19]

Thompson, Jr.

[11] Patent Number: 5,719,563
[45] Date of Patent: Feb. 17, 1998

[54] FIXED SITE MONITOR USING A LOCATION-BASED COMMUNICATIONS NETWORK

[75] Inventor: Darwin O. Thompson, Jr., Mission Viejo, Calif.

[73] Assignee: Teletrac, Inc., Kansas City, Mo.

[21] Appl. No.: 499,415

[22] Filed: Jul. 7, 1995

[51] Int. Cl.⁶ ................................................. G08C 17/00
[52] U.S. Cl. .................... 340/870.02; 340/870.16; 455/67.1; 455/67.4
[58] Field of Search ................. 340/870.05, 825.08, 340/870.06, 870.02, 870.04, 870.07, 870.11, 870.13, 870.16; 235/383, 385; 364/464.04; 342/44; 455/67.1, 67.4

[56] References Cited

U.S. PATENT DOCUMENTS

| | | | |
|---|---|---|---|
| 3,980,839 | 9/1976 | Hutcheson | 379/15 |
| 4,057,785 | 11/1977 | Furniss et al. | 340/870.15 |
| 4,199,761 | 4/1980 | Whyte et al. | 340/825.52 |
| 4,414,661 | 11/1983 | Karlstrom | 370/332 |
| 4,613,990 | 9/1986 | Halpern | 455/33.2 |
| 4,644,560 | 2/1987 | Torre et al. | 370/342 |
| 4,648,123 | 3/1987 | Schrock | 455/67.4 |
| 4,680,785 | 7/1987 | Akiyama et al. | 329/57 |
| 4,688,244 | 8/1987 | Hannon | 235/385 |
| 4,750,175 | 6/1988 | Brenneman et al. | 370/216 |
| 4,750,197 | 6/1988 | Denekamp | 235/385 |
| 4,779,262 | 10/1988 | Avis et al. | 370/347 |
| 4,818,998 | 4/1989 | Apsell et al. | 342/44 |
| 4,887,208 | 12/1989 | Schneider | 235/385 |
| 4,897,642 | 1/1990 | DiLullo | 235/385 |
| 4,926,158 | 5/1990 | Zeigler | 340/310.02 |
| 4,996,703 | 2/1991 | Gray | 379/40 |
| 5,049,873 | 9/1991 | Robins et al. | 340/825.06 |
| 5,061,922 | 10/1991 | Nishijima | 340/825.08 |
| 5,095,500 | 3/1992 | Tayloe et al. | 379/32 |
| 5,105,438 | 4/1992 | Ackroff et al. | 375/222 |
| 5,132,680 | 7/1992 | Tezuka | 340/825.08 |
| 5,194,860 | 3/1993 | Jones et al. | 340/370.02 |
| 5,301,122 | 4/1994 | Halpern | 340/870.02 |
| 5,309,474 | 5/1994 | Gilhousen et al. | 370/209 |
| 5,335,350 | 8/1994 | Felderman et al. | 455/17 |
| 5,335,360 | 8/1994 | Marko et al. | 455/56.1 |
| 5,343,493 | 8/1994 | Karimullah | 375/200 |
| 5,351,235 | 9/1994 | Lahtinen | 455/53.1 |
| 5,361,399 | 11/1994 | Linquist et al. | 455/56.1 |
| 5,365,516 | 11/1994 | Jandrell | 370/335 |
| 5,394,136 | 2/1995 | Lammers et al. | 340/439 |
| 5,438,329 | 8/1995 | Gastouniotis et al. | 340/870.02 |

FOREIGN PATENT DOCUMENTS 0344624  12/1989  European Pat. Off. ............... 455/54.2

OTHER PUBLICATIONS

Schefter, Jim, "Geostar", Popular Science, Feb. 1984, pp. 76–78, 130.

*Primary Examiner*—Jeffery Hofsass
*Assistant Examiner*—Albert K. Wong
*Attorney, Agent, or Firm*—Roylance, Abrams, Berdo & Goodman, L.L.P.

[57] ABSTRACT

A method for monitoring and controlling remote site parameters by using a location-based communications network. The system uses monitoring and control devices that are located at remote locations and controlled and monitored either at a control center or at a workstation which can request data responses and send commands to the remote sites based on the response data received from the remote sites.

14 Claims, 6 Drawing Sheets

FIXED SITE MONITOR USING A LOCATION-BASED COMMUNICATIONS NETWORK

BACKGROUND OF THE INVENTION

1. Field of the Invention

This invention relates in general to a location-based communications network, and in particular, to a method for monitoring and controlling of remote sites using a location based communications network.

2. Description of Related Art

Many companies want to know information regarding conditions at remote locations, and currently must send or station personnel at the remote locations to determine the conditions of interest. For example, fixed site monitoring is a common task that is performed by many companies, including electric, water and cable companies. Normally, the site locations are numerous and scattered throughout urban and remote areas. Equipment and supplies at each site must be monitored and maintained to achieve high levels of performance to meet customer needs. This task of monitoring and maintaining becomes rather expensive, since it requires a fleet of service and supply vehicles. The task is further complicated because the fleet is usually only dispatched after a major problem occurs, since remote sites are usually not staffed with personnel to monitor the equipment. Since the major problem has already occurred by the time a maintenance or resupply vehicle is sent, customer needs are not completely met, and customer satisfaction is eroded.

In addition, inventory control with such sites can be a difficult task. For example, it is difficult to maintain accurate inventories of equipment installed at remote sites, when the equipment may be subject to constant maintenance and replacement. Currently, inventory control is an intensive manual task that requires disciplined record keeping procedures. Alternatively, companies may have to perform frequent periodic accounting.

It can be seen, therefore, that there is a need for automatic monitoring of multiple remote sites to reduce or eliminate repair calls and reduce customer service interruptions. It can further be seen that there is a need for automatic inventory control for multiple remote sites.

SUMMARY OF THE INVENTION

To overcome the limitations in the prior art described above, and to overcome other limitations that will become apparent upon reading and understanding the present specification, the present invention discloses methods to monitor and control devices at remote locations. The present invention provides a method that allows an operator at a central location to monitor and control remote sites, and to determine how and when to perform additional actions to maintain the remote sites at maximum efficiency. The operator also has the ability to change device settings at the remote sites via the wireless communications network and to maintain accurate inventories of the equipment located at the remote sites.

A system in accordance with the principles of the present invention comprises a subscriber unit and monitoring devices at remote sites, a wireless location-based communication network for transmitting information to and from the remote sites, and an operator's workstation located at a central site of the network. The wireless location-based communications network comprises both transmitter sites and receiver sites for communicating with the remote sites, as well as the necessary equipment to determine the location of the remote sites.

One object of the present invention is to monitor devices at the remote sites by having the devices send data over the communications network. Another object of the present invention is to control devices at remote sites by transmitting commands to electrically-enabled controllers at the remote sites. Still another object of the present invention is to provide inventory control of the equipment at remote sites via the monitoring function.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

OVERVIEW

The present invention discloses methods to monitor and control devices at remote locations. The present invention provides a method that allows an operator at a central location to monitor and control remote sites, and to determine how and when to perform additional actions to maintain the remote sites at maximum efficiency. The operator also has the ability to change device settings at the remote sites via the wireless communications network and to maintain accurate inventories of the equipment located at the remote sites.

The present invention reduces the need for emergency calls and reduces the response time of the repair vehicles, because the sites are being monitored continuously via the wireless communications system. As conditions change at the various sites, an operator at a central site can dispatch part of the fleet to a given remote site that needs repair before an emergency occurs. The present invention allows companies to perform preventative maintenance as determined by conditions at each site, as opposed to a schedule, thereby making the preventative maintenance function more efficient since the need for maintenance can be determined at a moment's notice. Further, the present invention makes the repair fleet more efficient, because repair messages can be sent to the repair vehicle most able to respond to the problem.

The present invention also eliminates the need for some repair calls by having a remote control capability. Instead of sending a repair vehicle to a site, an operator can send a command to the site over the wireless communications system to change the settings on a device to reduce or eliminate the need for repair. This capability can augment the repair vehicle fleet, since the command can be sent as a temporary correction, and a separate call can be sent to the repair fleet to provide a more permanent repair. The present invention thus increases customer satisfaction and provides more continuous service to customers.

The present invention incorporates an inventory control function to maintain a database which automatically identifies equipment located at each remote site and thus eliminates the need for manually updating such a system. The inventory database is updated automatically in accordance with the maintenance, replacement, and installation of equipment at the various remote locations. The system provide for a more efficient use of resources to maintain equipment and the like, and can identify trend data for future equipment and maintenance needs.

SYSTEM DESCRIPTION

Figure 1:
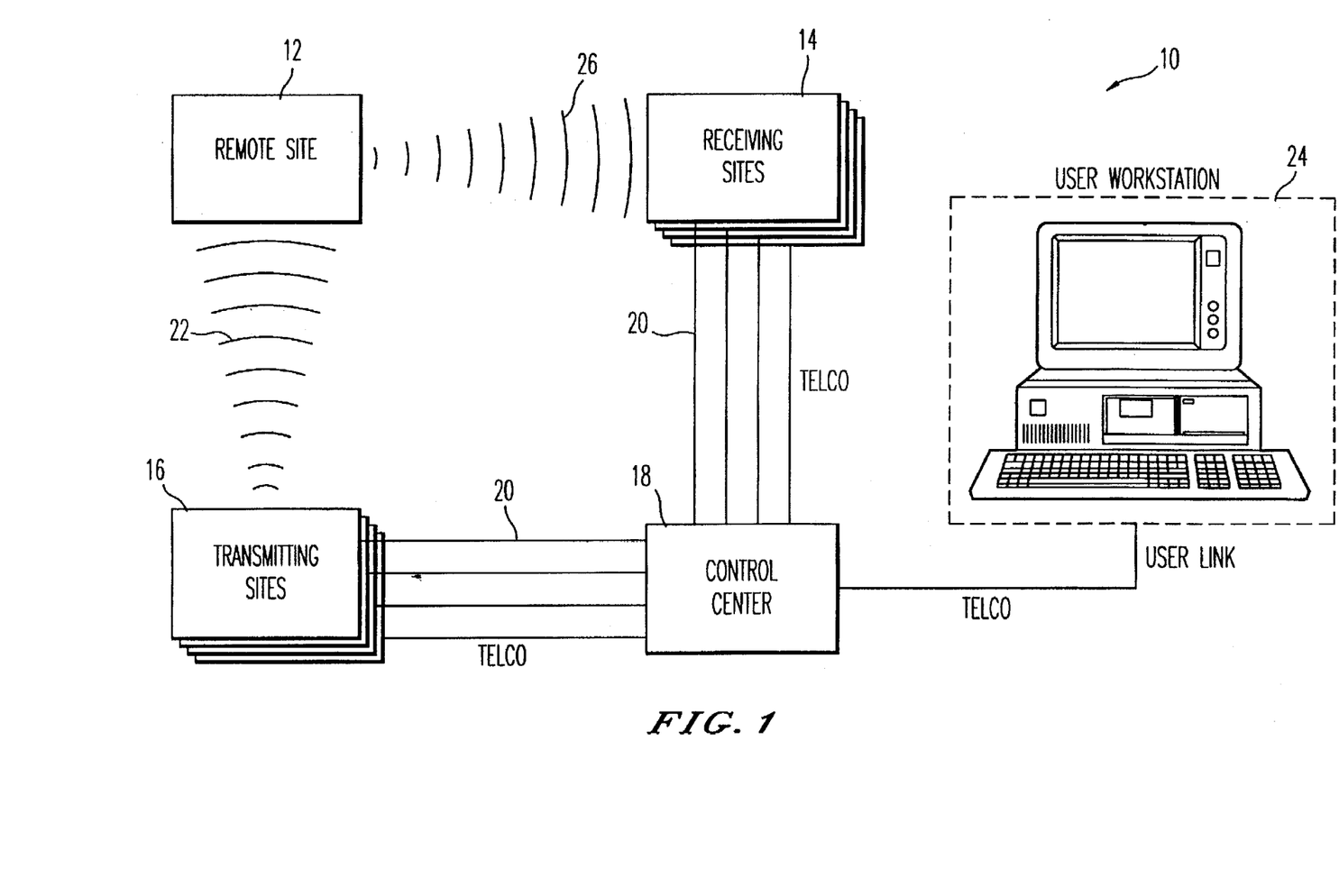
FIG. 1 is a system diagram of the fixed site monitoring system.

FIG. 1 illustrates an exemplary system according to the present invention. In the preferred embodiment, a location-based communications network 10, such as the AirTouch Teletrac™ network, is used to communicate with remote sites 12. Such networks 10 have proved useful in locating vehicles with a high degree of precision in a short period of time. Similarly, they are used in the present invention to locate or identify remote sites 12 with a high degree of precision.

The wireless communications network 10 includes both receiving sites 14 and transmitting sites 16 that are coupled to a control center 18. The transmit sites 16 and receive sites 14 are coupled to the control center 18 using a hardline cable 20 or the like. The coupling between the transmit sites 16, receive sites 14 and the control center 18 can also be an RF link, a baseband link, or any other communications link to transmit the data from the receive sites 14 to the control center 18.

Generally, the remote sites 12 are polled by messages 22 transmitted from the transmit sites 16, wherein the polling function may be initiated by an operator's workstation 24 coupled to the central site or in response to a request by the remote site 12 itself. These polling messages 22 include a unique identifier for each remote site 12. In response to receiving the polling message 22 with its unique identification, the remote site 12 transmits a response message 26 to the receive sites 14 in a particular time slot indicated by the polling message 22. The response message 26 is received at differing time intervals by multiple receive sites 14, and the response message 26 and the time intervals are transmitted to the control center 18. The control center 18 resolves the location of the remote site 12 using a multilateration method with the time intervals from receive sites 14. The resolved location and the response message 26 may then be transmitted to an operator's workstation 24 for further action.

The operator's workstation 24 can automatically perform many of the polling functions and database calculations with or without human intervention. The workstation 24 can also automatically store and retrieve items from a database if necessary for a specific application of the invention.

MONITORING APPLICATIONS

Figure 2:
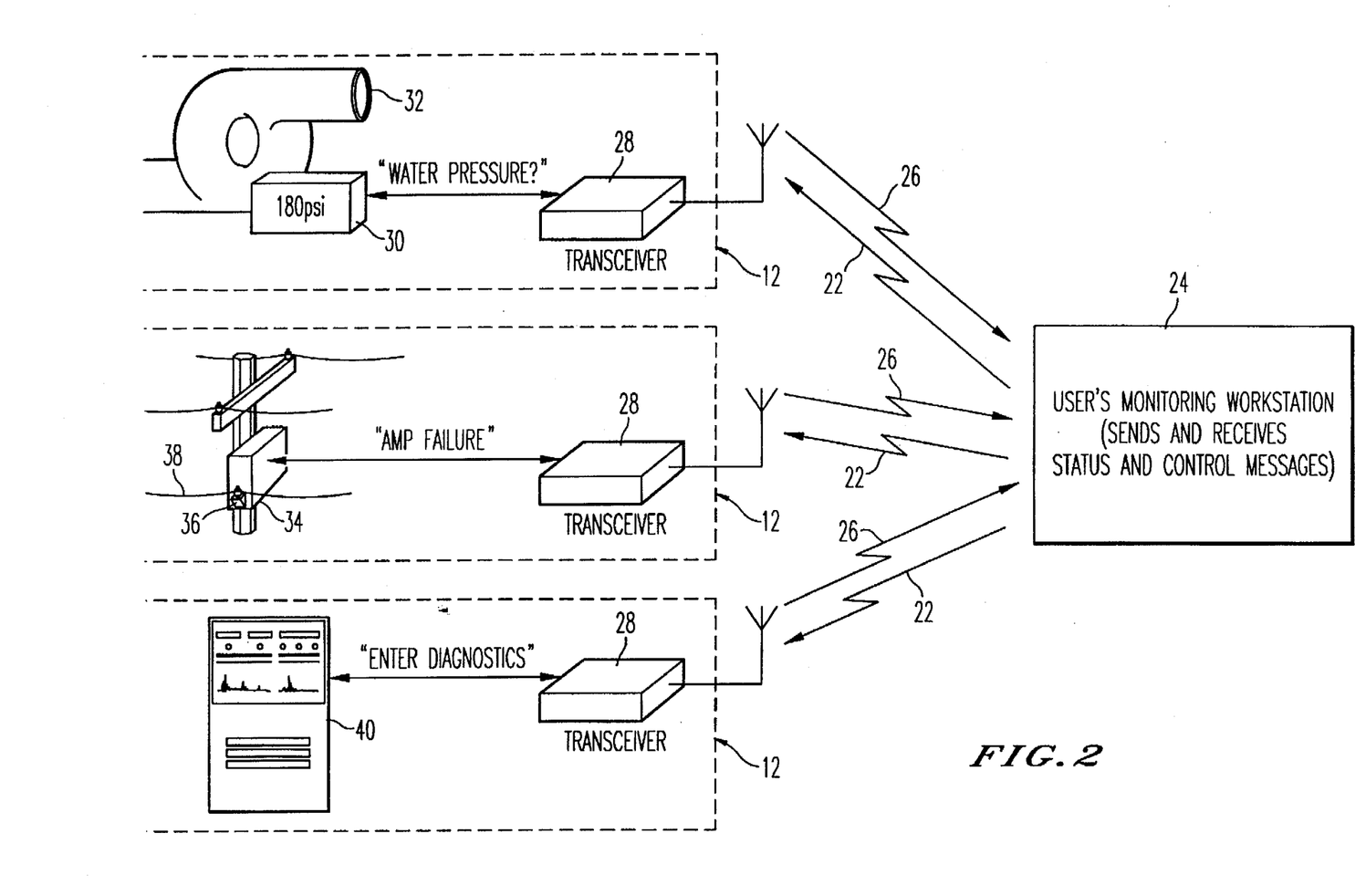
FIG. 2 is a diagram showing a typical use of the present invention.

FIG. 2 shows how the present invention can monitor remote sites 12. The workstation 24 sends polling messages 22 to various remote sites 12 requesting different information from each site 12.

For example, the remote site 12 may comprise a transceiver 28 coupled to a pump station 30. The pump station 30 may have a pressure sensor 32, which is polled to determine the pressure in the pump station 32. The pump station 32 then sends a response message 26 back to the workstation 24 via the network 10 for analysis.

In another example, the remote site 12 may comprise a transceiver 28 coupled to a power transformer 34. A current sensor 36 at the power transformer 34 can be polled by the workstation 24 to determine if there is current flowing in the wire 38. The power transformer 34 sends a response message 26 with this information back to the workstation 24. The workstation 24 can use this information to determine if maintenance is required, if power needs to be re-routed, or if the system is functioning at or near peak capacity.

In yet another example, the remote site 12 may comprise a transceiver 28 coupled to a computer or telephone switch 40. The computer 40 can be polled by the workstation 24 to run a diagnostic program and report the results. The computer 40 would then send a response message 26 to tell the workstation 24 what, if anything, needs to be repaired.

MONITORING FUNCTION

Figure 3:
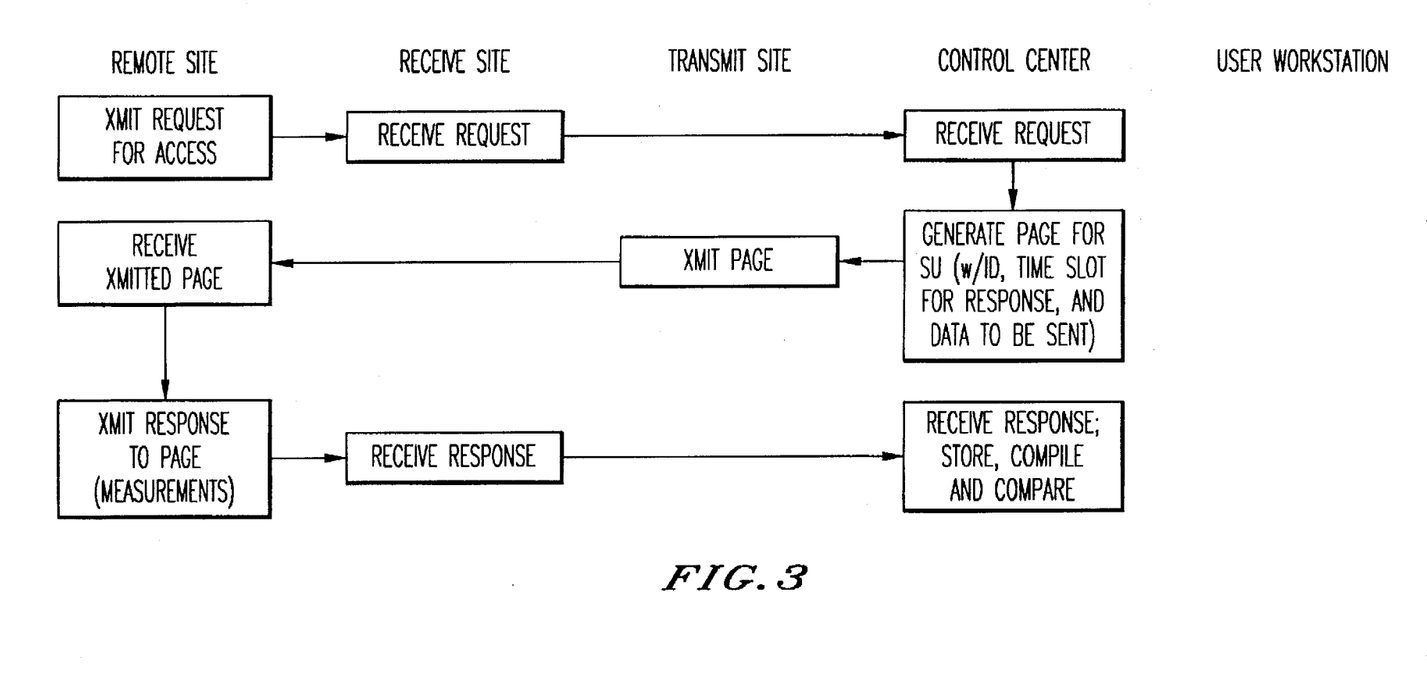
FIG. 3 is a flowchart of a remote site generated request for access to the communications system.

FIG. 3 is a flow chart showing how the location-based communications network 10 operates when the remote site 12 initiates a monitoring request. The remote site 12 may send such a request at pre-determined intervals, e.g., once every hour, or in emergency situations, e.g., when a measurement is outside of nominal bounds. The remote site 12 first transmits a monitoring request to the location-based communications network 10. This request contains the requesting site's identification number. The receive sites 14 receive the request, and pass the request on to the control center 18. In response, the control center 18 generates a page or poll for the remote site 12. The poll contains the identification number, indicates a time slot for the response from the remote site 12, and requests data from the remote site 12. The request for data can be a request for all of the data available at the remote site 12, a subset of the data, or just specific pieces of data. This polling message 22 is then transmitted from the transmit site 16.

Once the remote site 12 receives the polling message 22, it responds within a specific time interval. During that time interval, the remote site 12 transmits its data, which comprises the response message 26. The receive sites 14 receive the response message 26 and pass the response message 26 on to the control center 18. Using a multilateration technique, the control center 18 identifies the exact location for the remote site 12 and correlates the data to the specific remote site 12 based on the time interval of the response. The control center 18 then transmits the response message 26 to the workstation 24, which examines the data received from the remote site 12 to determine if the status or condition of the remote site 12 has changed. If a change has occurred, the operator or the workstation 24 itself can determine whether to take additional action, e.g., send out a repair truck, send a command to the remote site 12, or take some other appropriate action depending on which condition has changed and by how much.

POLLING FUNCTION

Figure 4:
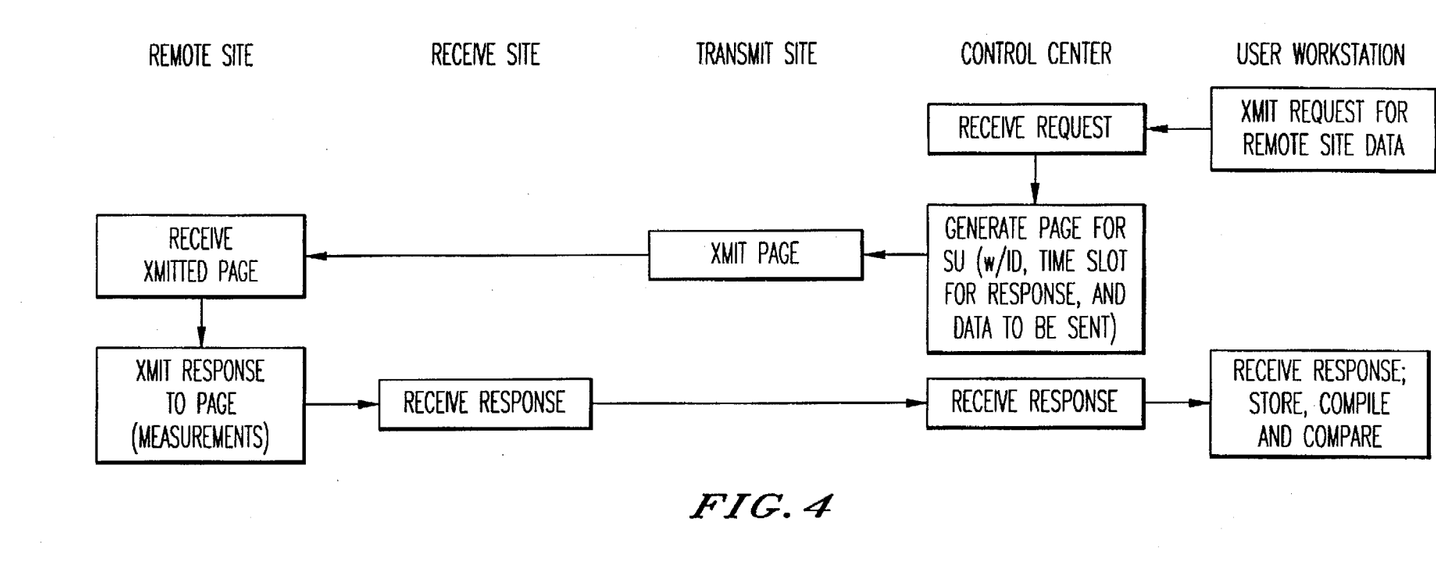
FIG. 4 is a flowchart of a workstation generated request for information from a remote site.

FIG. 4 is a flowchart describing the method for a workstation 24 to request data from a remote site 12. The workstation 24 first requests that a specific remote site 12 send a response message 26. The request contains the remote site 12 identification number and the data that the user would like to see returned to the workstation 24. The control center 18 receives the workstation 24 request and generates a polling message 22 containing the identification number for the specific remote site 12, an indicator for a unique time slot for the remote site 12 to respond within, and the data request from the workstation 24. The control center 18 passes this polling message 22 along to the transmit site 16, where it is transmitted to the remote site 12. Once the remote site 12 receives the page, the remote site 12 transmits a response message 26 containing the data that was requested. The receive sites 14 receive the response message 26 from the remote site 12, and pass the message along to the control center 18. The control center 18 uses a multilateration scheme to determine the location of the remote site 12, and passes the location data along with the requested data to the workstation 24. Once the workstation 24 receives the response message 26 and location information, the workstation 24 can automatically compare the data to prior data and determine whether additional actions need to be taken, or the decision to take additional action can be left to the operator.

COMMAND FUNCTION

Figure 5:
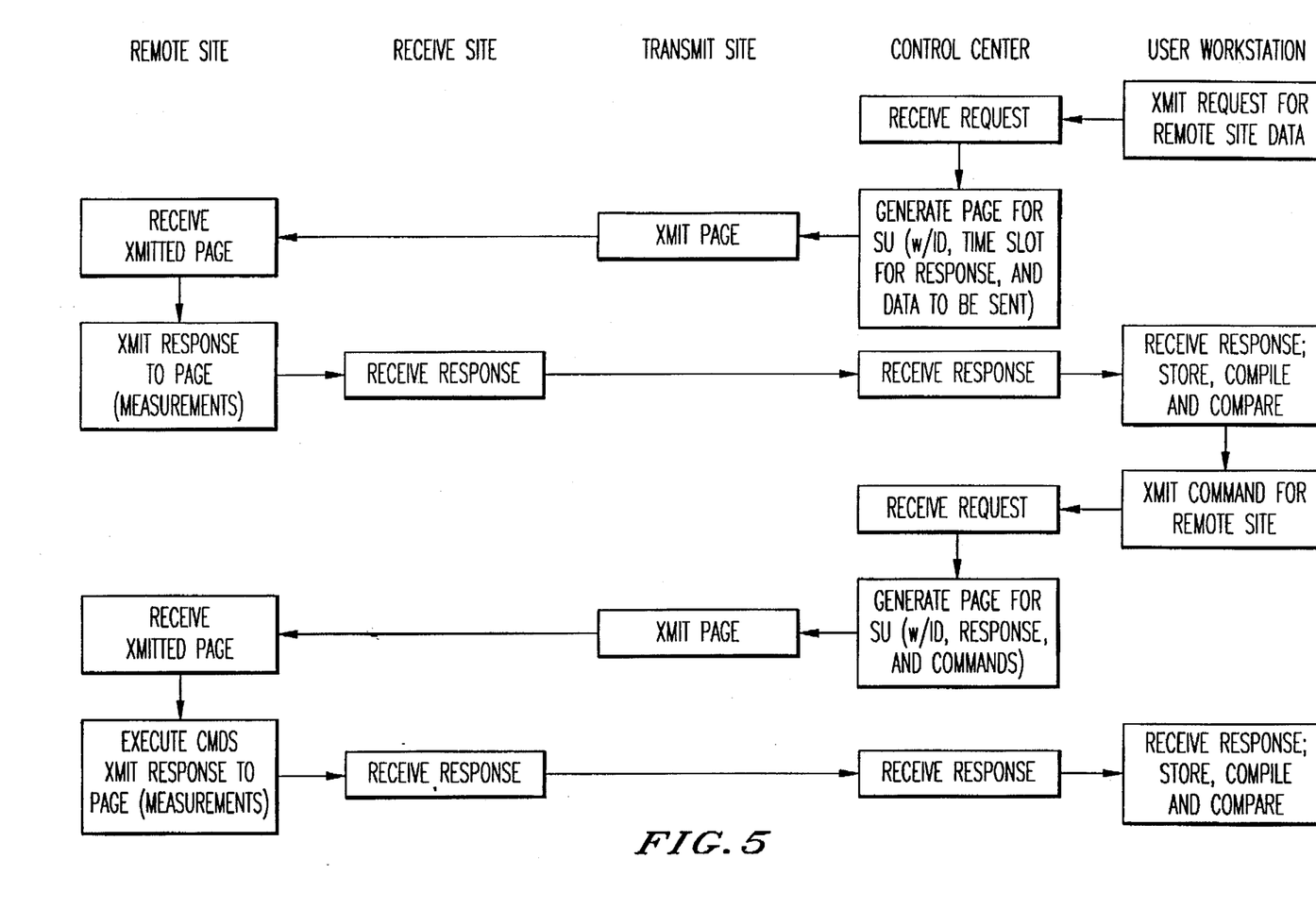
FIG. 5 is a flowchart for commanding a remote site to perform some function.

FIG. 5 is a flowchart describing the method for commanding the remote site 12 to perform some function at the remote site. The command can be initiated independently by the operator at the workstation or it can be generated based on the response message 26 from the remote site 12. If the command is based on a response message 26, the workstation 24 first requests that a specific remote site 12 send a response message 26. The request contains the remote site 12 identification number and the data to be returned to the workstation 24. The control center 18 receives the request from the workstation 24 and generates a polling message 22 that contains the identification number, identifies the unique time slot for the remote site 12 to respond within, and requests certain data. The control center 18 passes this polling message 22 along to the transmit site 16, where it is transmitted to the remote site 12. Once the remote site 12 receives the page, the remote site 12 transmits a response message 26 containing the data that was requested in a specific time slot. The receive sites 14 receive the response message 26 from the remote site 12, and pass the message along to the control center 18. The control center 18 uses a multilateration scheme to determine the location of the remote site 12, and transmits the location data along with the requested data to the workstation 24. Once the workstation 24 receives the response message 26 and location information, the workstation 24 generates a command for the remote site 12 and sends the command to the control center 18. The command also contains the identification number of the remote site 12. The command center then generates the polling message 22 containing the identification number, the time slot for the response from the remote site 12, and the command or commands to be sent to the remote site 12. The polling message 22 is then sent to the remote site 12 from the transmit site 16. Once received at the remote site 12, the commands are executed. The remote site 12 then generates a response to the polling message 22, which may comprise an acknowledgement of the command. The response is received at the receive sites 14 and passed along to the control center 18 and the workstation 24. The workstation 24 can then determine if additional actions need to be taken.

INVENTORY CONTROL FUNCTION

Figure 6:
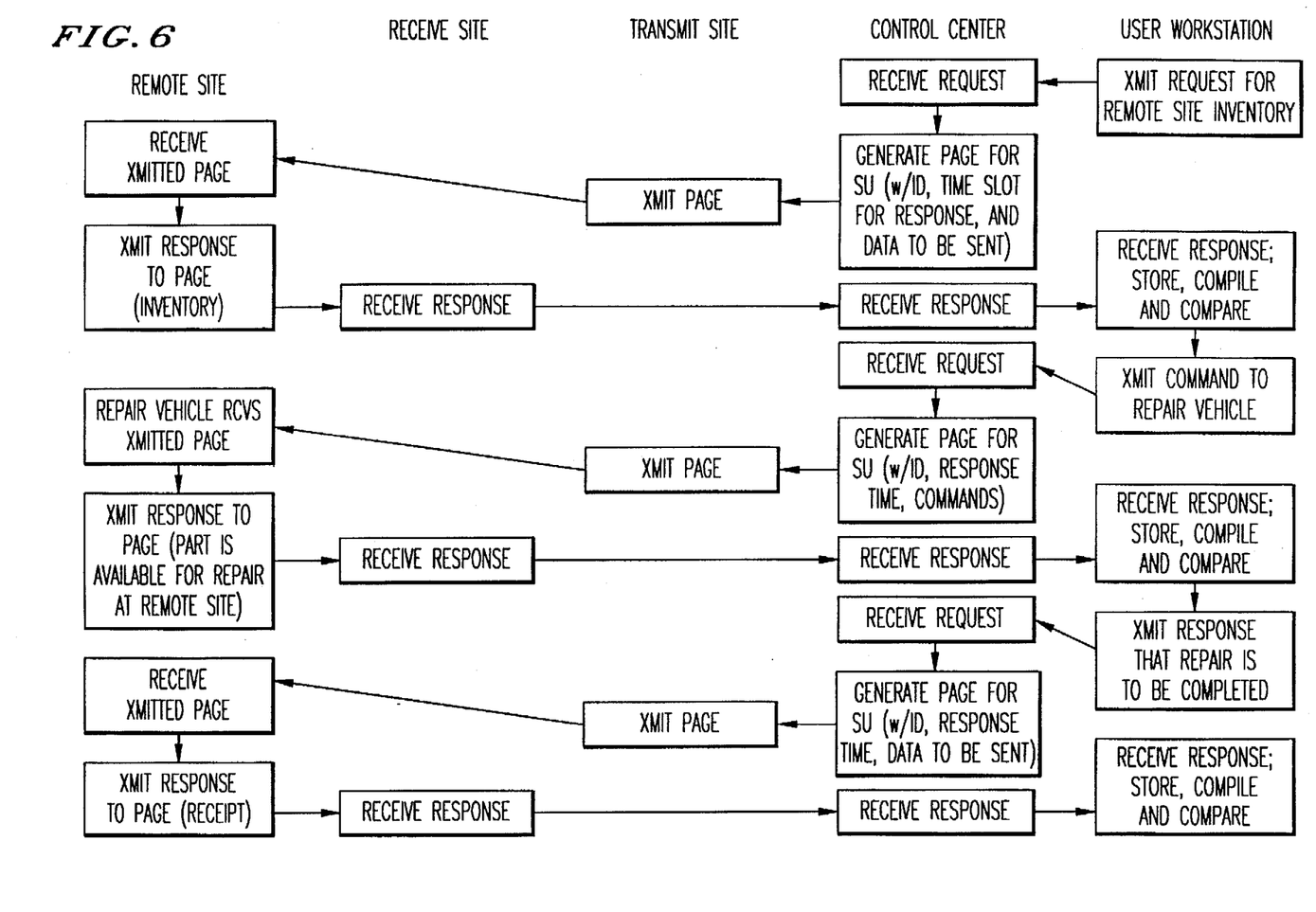
FIG. 6 is a flowchart for monitoring a remote site using an inventory control system.

FIG. 6 is a flowchart which shows how the remote site 12 can be monitored for an inventory control system. The workstation 24 requests information of the remote site 12 to determine the equipment in use at the remote site 12. The remote site 12 responds to the request with an inventory of the items at the remote site 12. There can also be automatic updates generated by the remote site 12, e.g., when a piece of equipment is in need of service, when certain pieces of equipment fail, when equipment is replaced, etc. The workstation 24 receives the response from the remote site 12 and compares the data received with the inventory in its database to determine whether to update its inventory.

The workstation 24 can also generate commands to perform a variety of functions in response to a change in inventory. For example, if the equipment at the remote site 12 only needs adjustment, then the workstation 24 may send a command to adjust the equipment; if the equipment at the remote site 12 requires replacement, then the workstation 24 may dispatch a repair crew to the remote site 12 to replace the equipment. Any change in the condition of the equipment can be automatically reflected in the inventory control database maintained by the workstation 24. Further, the addition or deletion of equipment at the remote site 12, for example, in response to changes in demand or capacity, can be automatically reflected in the inventory database maintained by the workstation 24.

This ability to query remote sites 12 and receive an accurate inventory of the equipment located there may be performed using several different configurations. For example, the equipment could be coupled to a transceiver 28 at the remote site 12 and have sufficient memory and intelligence to provide the transceiver 28 with a serial number, equipment condition, and other information. Alternatively, there may be a man-machine interface (MMI) for the transceiver 28 at the remote site 12, so that a technician can manually enter equipment information that is later retrieved and stored in the inventory control database of the workstation 24. Those skilled in the art will recognize that many other similar or related techniques for providing equipment inventory could be used without departing from the scope of the present invention.

CONCLUSION

In conclusion, the present invention discloses methods to monitor and control devices at remote locations. The present invention provides a method that allows an operator at a central location to monitor and control remote sites 12, and to determine how and when to perform additional actions to maintain the remote sites 12 at maximum efficiency. The operator also has the ability to change device settings at the remote sites 12 via the wireless communications network 10 and to maintain accurate inventories of the equipment located at the remote sites 12.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for monitoring a device located at a remote site, comprising the steps of:

(a) transmitting a polling message from a transmitting site to the subscriber unit in response to an access request message, the polling message comprising the identification number of the subscriber unit, data defining a unique time interval for transmission of a response message from the subscriber unit located at the remote site, and a data request which defines the requested data;

(b) transmitting a response message from the subscriber unit located at the remote site in response to the polling message during the time interval to a plurality of receiving sites, the response message comprising measurements made by the devices coupled to the subscriber unit located at the remote site, the receiving sites each receiving the response message at different times;

(c) determining the location of the subscriber unit from the time difference of arrival of the response message at the receiving sites; and (d) analyzing the measurements made by the devices coupled to the subscriber unit at the remote site, the step of analyzing further comprising storing the measurements, comparing the stored measurements to previously known values for the measurements, using the location data and the stored measurements to automatically determine whether a measurement has changed at a remote site, and deciding whether to perform additional actions based on whether a measurement has changed and the amount of the change.

2. The method of claim 1, wherein the method further comprises the steps of generating an access request message at a workstation located remotely with respect to the subscriber unit, the access request message comprising an identification number unique to the subscriber unit, and using the identification number to generate the polling message.

3. The method of claim 1, wherein the method further comprises the steps of monitoring at least one measurement device at the remote site, and generating a mobile information service access request based on the device measuring a parameter which falls outside of pre-selected limits for that parameter.

4. The method of claim 1, wherein the method further comprises the steps of receiving the response message at a control center and generating a repair message to at least one mobile unit in response to the response message.

5. The method of claim 4, wherein the repair message is sent to the most desirable repair unit, the most desirable repair unit status determined by location, utilization status, availability, and capabilities of the repair units.

6. The method of claim 1, wherein the polling message is generated at a control center.

7. The method of claim 1, wherein the method further comprises the steps of transmitting an access request message from a subscriber unit located at a remote site to one or more receiving sites, the access request message comprising an identification number unique to the subscriber unit.

8. A method for controlling a device located at a remote site, comprising the steps of:

(a) generating a polling message, the polling message comprising the identification number of a subscriber unit located at the remote site, data defining a unique time interval for transmission of a response message from the subscriber unit, and a data request which tells the subscriber unit which data is to be sent in the response message;

(b) polling the subscriber unit at the remote site by transmitting the polling message;

(c) transmitting a response message from the subscriber unit in response to the polling message during the time interval to at least three receiving sites, the response message comprising measurements made by the devices at the remote site;

(d) locating the remote site from the time difference of arrival of the response message at three receiving sites;

(e) compiling the measurements made by the devices at the remote site, the step of compiling further comprising storing the measurements, comparing the stored measurements to previously known values for the measurements, using the location data and the stored measurements to automatically determine whether a measurement has changed at a remote site, and deciding whether to perform additional actions based on whether a measurement has changed and the amount of the change; and (f) generating a command to be sent to the remote site to change at least one parameter at the remote site based on the measurements received from the remote site.

9. The method of claim 8, wherein the method further comprises the step of generating an access request message at a workstation located remotely with respect to the subscriber unit, the access request message comprising an identification number unique to the subscriber unit, and using the identification number to generate the polling message.

10. The method of claim 8, wherein the method further comprises the steps of monitoring at least one measurement device at the remote site, and generating a mobile information service access request based on the device measuring a parameter which falls outside of pre-selected limits for that parameter.

11. The method of claim 8, wherein the polling message is generated at a control center.

12. The method of claim 8, wherein the method further comprises the step of requesting access to a mobile information service at pre-defined intervals by transmitting an access request message from a subscriber unit at a remote site to at least one receiving site, the access request message comprising an identification number unique to the subscriber unit located at the remote site.

13. The method of claim 8, wherein the method further comprises the steps of generating a second response message after the command has been executed at the remote site to verify that the command has been executed.

14. The method of claim 8, wherein the subscriber unit is coupled to an interface which allows for the data that can be sent in the response message to be entered manually.

* * * * *